(12) United States Patent (10) Patent No.: US 12,686,484 B2
Ikeda et al. (45) Date of Patent: Jul. 21, 2026

(54) MOBILE OBJECT AND MOBILE OBJECT FLYING METHOD

(71) Applicant: DIC Corporation, Tokyo (JP)

(72) Inventors: Takashi Ikeda, Tokyo (JP); Tomoyuki Furukawa, Tokyo (JP); Kyouichi Toyomura, Tokyo (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 18/867,975

(22) PCT Filed: May 26, 2023

(86) PCT No.: PCT/JP2023/019796
§ 371 (c)(1),
(2) Date: Nov. 21, 2024

(87) PCT Pub. No.: WO2023/234226
PCT Pub. Date: Dec. 7, 2023

(65) Prior Publication Data
US 2025/0319957 A1      Oct. 16, 2025

(30) Foreign Application Priority Data
May 30, 2022      (JP) ................................ 2022-088054

(51) Int. Cl.
*B64C 1/08* (2006.01)
*B64U 10/16* (2023.01)
*B64U 30/294* (2023.01)
(52) U.S. Cl.
CPC ................ *B64C 1/08* (2013.01); *B64U 10/16* (2023.01); *B64U 30/294* (2023.01)

(58) Field of Classification Search
CPC .... B64U 10/16; B64U 30/294; B64U 30/297; B64U 10/13; B64C 1/08; B64C 27/006
See application file for complete search history.

(56) References Cited

U.S. PATENT DOCUMENTS

| | | | | |
|---|---|---|---|---|
| 10,106,277 B2 * | 10/2018 | Neely | .................... | B64U 20/87 |
| 10,730,626 B2 * | 8/2020 | Gil | ........................... | B64D 1/22 |
| 11,040,768 B2 * | 6/2021 | Bailly | .................... | B64C 17/02 |

(Continued)

FOREIGN PATENT DOCUMENTS

| | | | | |
|---|---|---|---|---|
| CN | 108791802 B | 10/2019 | | |
| JP | 2018-39488 A | 3/2018 | | |
| WO | WO-2020064577 A1 * | 4/2020 | ............. | B64U 20/30 |

OTHER PUBLICATIONS

International Search Report dated Aug. 1, 2023, issued in counterpart International Application No. PCT/JP2023/019796 (2 pages).

*Primary Examiner* — Joshua D Huson
(74) *Attorney, Agent, or Firm* — WHDA, LLP

(57) ABSTRACT

A mobile object 1 according to the present disclosure includes a body 10 provided as a first polyhedron, and rotary-wing modules 20 attached to the body 10 at all vertices of the first polyhedron. The rotary-wing modules 20 each include a rotary wing 21 and a drive unit 22. The drive unit 22 is configured to drive the rotary wing 21. The rotary wings 21 are located outside the body 10 and each have a rotation axis that is a straight line connecting a reference point P0 and a corresponding one of the vertices of the first polyhedron. The reference point P0 is defined inside the body 10.

14 Claims, 10 Drawing Sheets

(56)                    References Cited

U.S. PATENT DOCUMENTS

2018/0002012 A1*   1/2018  McCullough .......... B64U 10/16
2018/0194463 A1    7/2018  Hasinski et al.
2021/0163122 A1*   6/2021  Kawakami ............. B64D 45/00

* cited by examiner

<u>1</u>

<u>1</u>

1

30

V

30

FIG. 8A    30
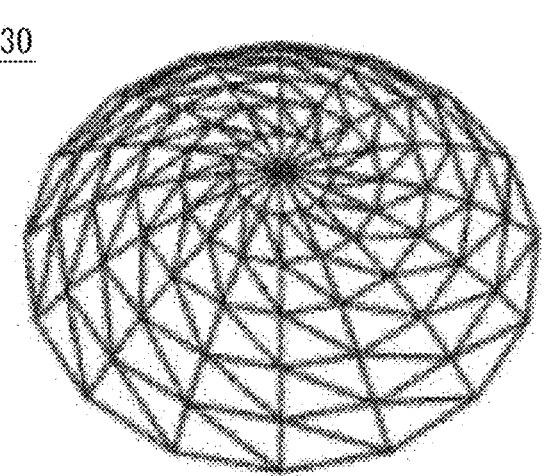
FIG. 8B    30
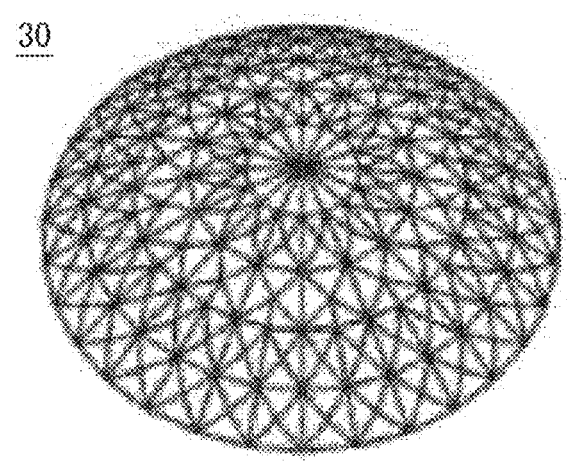
FIG. 8C    30
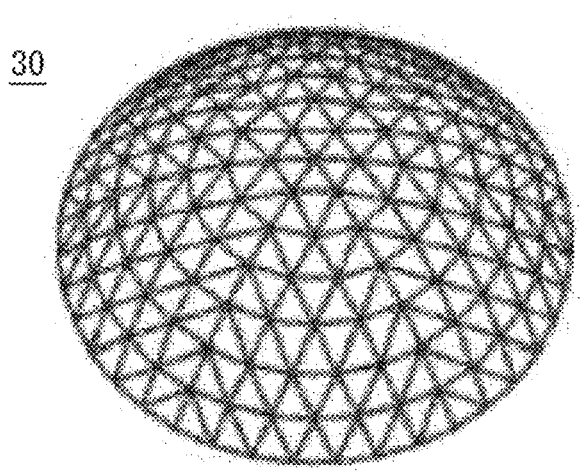

FIG. 8D    <u>30</u>
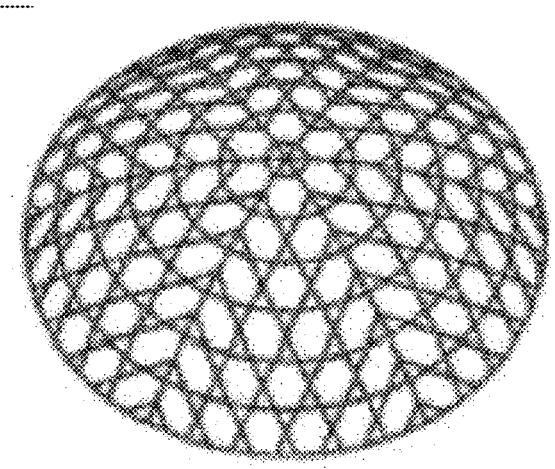
FIG. 8E
<u>30</u>
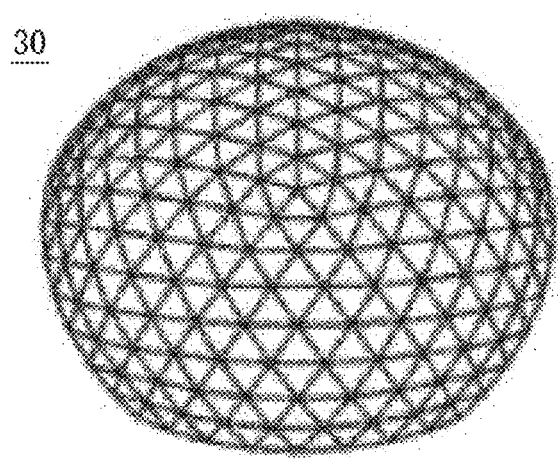
FIG. 8F   <u>30</u>
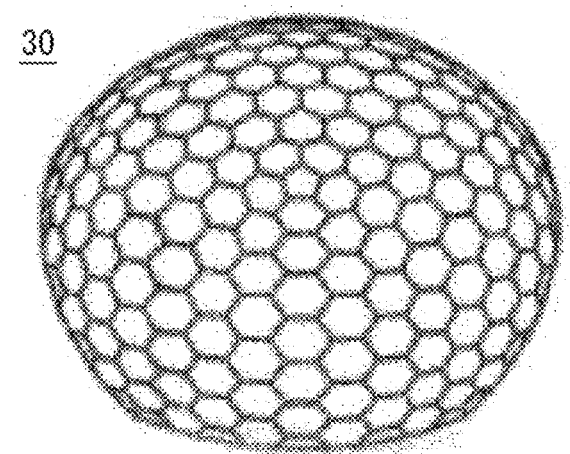

MOBILE OBJECT AND MOBILE OBJECT FLYING METHOD

TECHNICAL FIELD

The present disclosure relates to a mobile object and a mobile-object-flying method. The present application claims priority to Japanese Patent Application No. 2022-088054 filed in Japan on May 30, 2022, the entire contents of which are incorporated herein by reference,

BACKGROUND ART

Hitherto, technologies related to mobile objects such as drones have become widespread. For example, a device disclosed in PTL 1 realizes both vibration prevention and shock elimination for an unmanned aircraft equipped with a rotary spherical frame.

CITATION LIST

Patent Literature

PTL 1: Japanese Unexamined Patent Application Publication No. 2018-039488

SUMMARY OF INVENTION

Technical Problem

While the field of application of mobile objects has been spreading, such a mobile object is also desired to become autonomously navigable in the future. In this respect, one important requirement is that the mobile object is stably movable regardless of external factors such as wind.

An object of the present disclosure is to provide a mobile object that is stably movable regardless of external factors such as wind, and a mobile-object-flying method.

Solution to Problem

The present disclosure provides the following.

(1)

A mobile object includes:

a body provided as a first polyhedron; and rotary-wing modules attached to the body at vertices of the first polyhedron, the rotary-wing modules each including a rotary wing and a drive unit, the drive unit being configured to drive the rotary wing.

The rotary wings are located outside the body and each have a rotation axis that is a straight line connecting a reference point and a corresponding one of the vertices of the first polyhedron, the reference point being defined inside the body.

(2)

In the mobile object according to (1) above, the reference point may be a center of gravity of the body.

(3)

In the mobile object according to (1) or (2) above, the reference point may be a geometric center of the first polyhedron.

(4)

In the mobile object according to any one of (1) to (3) above, the first polyhedron may be a regular hexahedron.

(5)

The mobile object according to any one of (1) to (4) above may further include:

a cage attached to the body and defining an outline shape of the mobile object in such a manner as to surround the body and the rotary-wing modules from outside.

The cage may be provided as a second polyhedron.

(6)

In the mobile object according to (5) above, the cage may be fixed to the body.

(7)

In the mobile object according to (5) or (6) above, the second polyhedron may be a lattice dome.

(8)

In the mobile object according to (7) above, the lattice dome may be a Fuller dome.

(9)

In the mobile object according to any one of (1) to (8) above, the mobile object may be a drone designed for flight.

The present disclosure provides the following.

(10)

A mobile-object-flying method is a method of flying the mobile object according to any of (1) to (9) above and includes:

performing movement and attitude maintenance by activating, with one face of the first polyhedron being a face on an upper side in a vertical direction, only the rotary-wing modules that are located at vertices of the one face.

(11)

In the mobile-object-flying method according to (10) above, in response to the mobile object changing an attitude such that the one face is no longer the face on the upper side, the attitude of the mobile object may be changed by activating the rotary-wing modules at vertices of the first polyhedron such that the one face or another face different from the one face takes a place of the face on the upper side.

The present disclosure provides the following.

(12)

A mobile-object-flying method is a method of flying the mobile object according to any of (1) to (11) above and includes:

performing movement and attitude maintenance by activating, with one of the rotary-wing modules that is at one vertex of the first polyhedron being located vertically upward and one of the rotary-wing modules that is at another vertex on an opposite side being located vertically downward, only the two rotary-wing modules such that corresponding two of the rotary wings rotate in opposite directions.

(13)

In the mobile-object-flying method according to (12) above, in response to the mobile object changing an attitude such that positions of the one vertex and the another vertex located opposite each other are shifted, the attitude may be changed by activating the rotary-wing modules at vertices of the first polyhedron such that a same pair or another pair of two vertices that are opposite each other are located vertically upward and downward.

The present disclosure provides the following.

(14)

A mobile-object-flying method is a method of flying the mobile object according to any one of (5) to (8) above and includes:

maintaining the body in a level attitude with the cage being rotatable in conformity with a shape of the second polyhedron.

Advantageous Effects of Invention

According to the present disclosure, a mobile object that is stably movable regardless of external factors such as wind, and a mobile-object-flying method can be provided.

BRIEF DESCRIPTION OF DRAWINGS

FIG. 8A is a diagram illustrating a part of a configuration of a cage according to a first variation.

FIG. 8B is a diagram illustrating a part of a configuration of a cage according to a second variation.

FIG. 8C is a diagram illustrating a part of a configuration of a cage according to a third variation.

FIG. 8D is a diagram illustrating a part of a configuration of a cage according to a fourth variation.

FIG. 8E is a diagram illustrating a part of a configuration of a cage according to a fifth variation.

FIG. 8F is a diagram illustrating a part of a configuration of a cage according to a sixth variation.

DESCRIPTION OF EMBODIMENTS

An embodiment of the present disclosure will mainly be described below with reference to the accompanying drawings.

Figure 1:
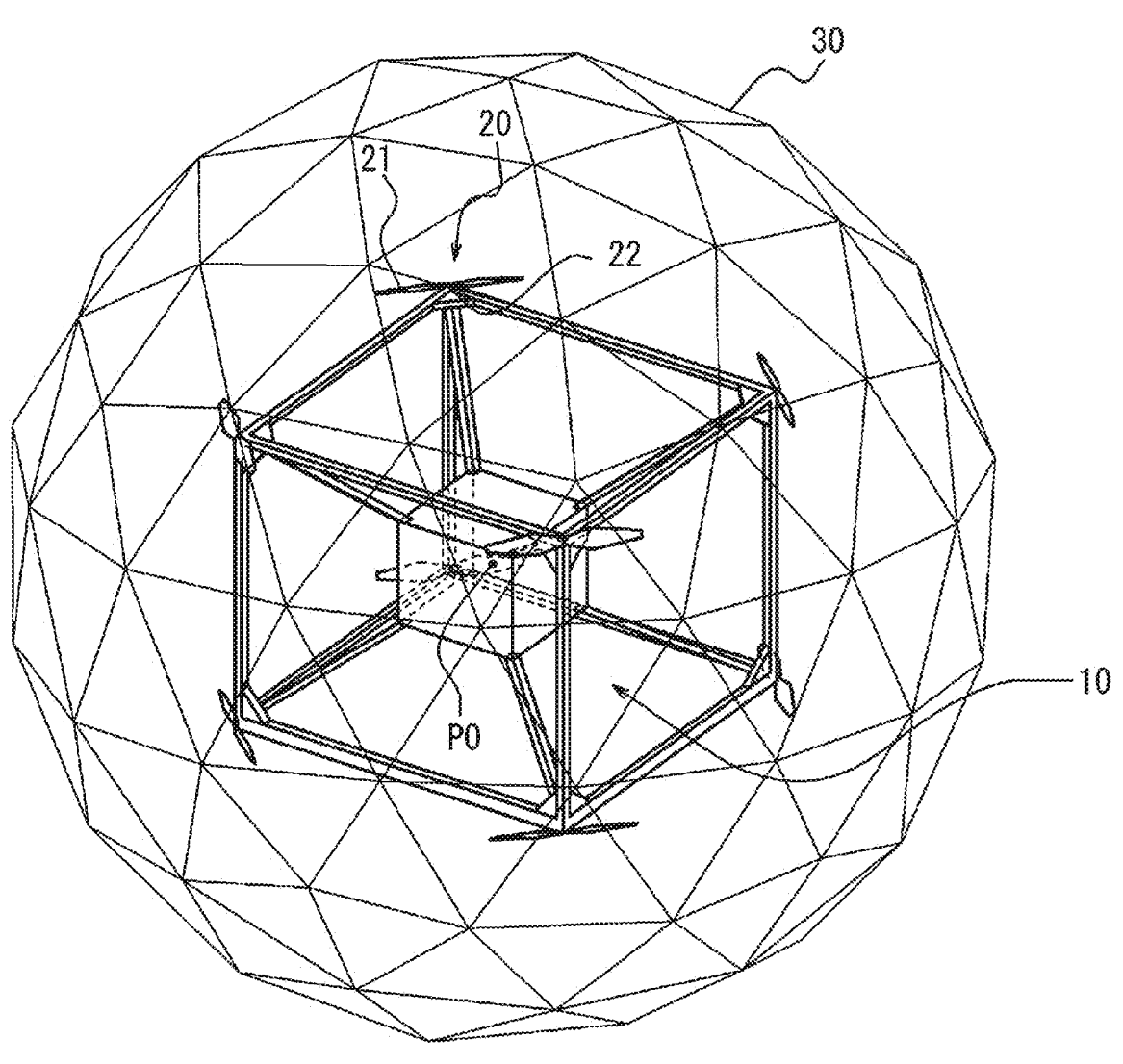
FIG. 1 is a diagram illustrating a configuration of a mobile object according to an embodiment of the present disclosure.

FIG. 1 is a diagram illustrating a configuration of a mobile object 1 according to an embodiment of the present disclosure. Referring to FIG. 1, the configuration of the mobile object 1 according to the one embodiment will mainly be described.

The mobile object 1 according to the one embodiment of the present disclosure encompasses any flying object and the like. Examples of the mobile object 1 include flying objects such as a drone and a multicopter that are designed for flight.

The mobile object 1 is configured to move at least one of an outdoor space and an indoor space.

The mobile object 1 uses radio communication to control actions regarding the movement including traveling route, traveling attitude, traveling speed, and the like. The mobile object 1 is not configured to be operated by a human who is on board, but is movable with no human on board by cooperating with any control device through radio communication. Even if a human is on board, the mobile object 1 is movable by cooperating with any control device through radio communication without being operated by the human. In the present disclosure, "control device" encompasses, for example, a controller to be operated by a human for controlling actions regarding the movement of the mobile object 1, a server communicably connected to the mobile object 1 over a network through radio communication, and the like.

Employing autonomous navigation enables the mobile object 1 to move autonomously without depending on the above control device. For example, the mobile object 1 may be configured to move autonomously while identifying objects, such as obstacles, that are present at the destination with the use of an ultrasonic sensor or the like and measuring the distances from the mobile object 1 to such objects. For example, the mobile object 1 may be combined with a measurement unit including an acceleration sensor, a gyroscope, and so forth so that the mobile object 1 can autonomously turn around a target object or a target position.

The mobile object 1 may further include, in addition to such a sensor device, any sensor device including an imaging device or the like so that any data, information, and the like can be acquired through the sensor device. For example, the mobile object 1 flying through a narrow space may use the imaging device to take images of examination target portions included in the floor, walls, ceiling, and the like that define the narrow space, and may output the thus taken images as data for an inspection purpose to any external device through radio communication.

The mobile object 1 includes a body 10, rotary-wing modules 20, and a cage 30 as major elements thereof.

The rotary-wing modules 20 each include a rotary wing 21 and a drive unit 22. The drive unit 22 is configured to drive the rotary wing 21. The rotary-wing modules 20 are attached to the body 10 on the basis of any attaching structure. The mobile object 1 is movable with the operation of the rotary-wing modules 20.

The cage 30 is attached to the body 10 on the basis of any attaching structure. The cage 30 defines the outline shape of the mobile object 1 in such a manner as to surround the body 10 and the rotary-wing modules 20 from outside. The cage 30 is fixed to the body 10. In response to the cage 30 rotating with the rotation of the mobile object 1, the body 10 rotates by following the rotation of the cage 30. In contrast, as long as the cage 30 is maintained in a certain attitude, the body 10 is maintained in an attitude corresponding to the attitude of the cage 30. Attitudes to be taken by the body 10 correspond one-to-one to attitudes to be taken by the cage 30.

Figure 2:
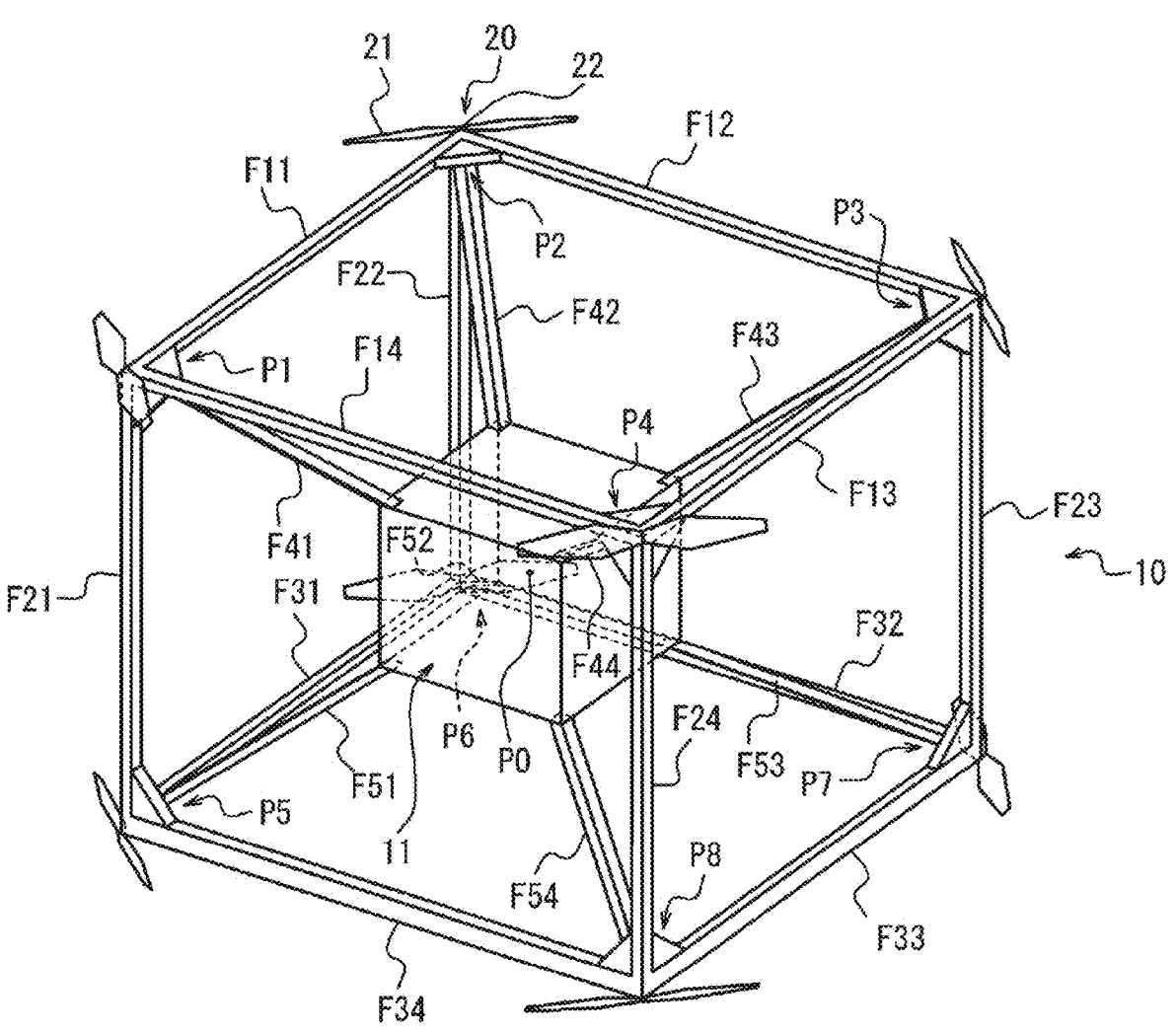
FIG. 2 is a diagram illustrating a part of the configuration of the mobile object illustrated in FIG. 1.

FIG. 2 is a diagram illustrating a part of the configuration of the mobile object 1 illustrated in FIG. 1. In FIG. 2, the cage 30 of the mobile object 1 is not illustrated, and only the body 10 and the rotary-wing modules 20 are illustrated.

The body 10 is provided as a first polyhedron. The first polyhedron is a regular hexahedron. The body 10 has an outline shape of a regular hexahedron. More specifically, the body 10 includes four frames F11, F12, F13, and F14, which define the top face of the regular hexahedron in FIG. 2. The body 10 includes four frames F21, F22, F23, and F24, which are located at the four lateral faces of the regular hexahedron in FIG. 2. The body 10 includes four frames F31, F32, F33, and F34, which define the bottom face of the regular hexahedron in FIG. 2. The body 10 has an outline shape of a regular hexahedron defined by the above twelve frames.

The body 10 has four vertices located at the top face of the regular hexahedron in FIG. 2. More specifically, the body 10 has a first vertex P1, a second vertex P2, a third vertex P3, and a fourth vertex P4. The first vertex P1 is located at the intersection of the frames F11, F14, and F21. The second vertex P2 is located at the intersection of the frames F12, F11, and F22. The third vertex P3 is located at the intersection of the frames F13, F12, and F23. The fourth vertex P4 is located at the intersection of the frames F14, F13, and F24.

The body 10 has four vertices located at the bottom face of the regular hexahedron in FIG. 2. More specifically, the body 10 has a fifth vertex P5, a sixth vertex P6, a seventh vertex P7, and an eighth vertex P8. The fifth vertex P5 is located at the intersection of the frames F31, F34, and F21. The sixth vertex P6 is located at the intersection of the frames F32, F31, and F22. The seventh vertex P7 is located at the intersection of the frames F33, F32, and F23. The eighth vertex P8 is located at the intersection of the frames F34, F33, and F24.

The body 10 includes frames extending from the four respective vertices located at the top face of the regular hexahedron in FIG. 2 toward the inside of the body 10. More specifically, the body 10 includes a frame F41, which extends from the first vertex P1 toward the inside of the body 10. The body 10 includes a frame F42, which extends from the second vertex P2 toward the inside of the body 10. The body 10 includes a frame F43, which extends from the third vertex P3 toward the inside of the body 10. The body 10 includes a frame F44, which extends from the fourth vertex P4 toward the inside of the body 10.

The body 10 includes frames extending from the four respective vertices located at the bottom face of the regular hexahedron in FIG. 2 toward the inside of the body 10. More specifically, the body 10 includes a frame F51/which extends from the fifth vertex P5 toward the inside of the body 10. The body 10 includes a frame F52, which extends from the sixth vertex P6 toward the inside of the body 10. The body 10 includes a frame F53, which extends from the seventh vertex P7 toward the inside of the body 10. The body 10 includes a frame F54, which extends from the eighth vertex P8 toward the inside of the body 10.

The body 10 includes an accommodation box 11, which is located inside the regular hexahedron defined by the twelve frames F11, F12, F13, F14, F21, F22, F23, R24, F31, F32, F33, and F34. The accommodation box 11 is connected to ends of the eight frames F41, F42, F43, F44, F51, F52, F53, and F54 on a side opposite the respective vertices of the regular hexahedron.

The accommodation box 11 may be a sphere or a polyhedron. For example, the accommodation box 11 is provided as a regular hexahedron. The body 10 is obtained by placing the accommodation box 11, which is a regular hexahedron, at the center of the regular hexahedron provided as the first polyhedron defining the outline shape of the body 10. The accommodation box 11 accommodates any functional modules to be described below that are necessary for the mobile object 1 to perform various actions.

Figure 3:
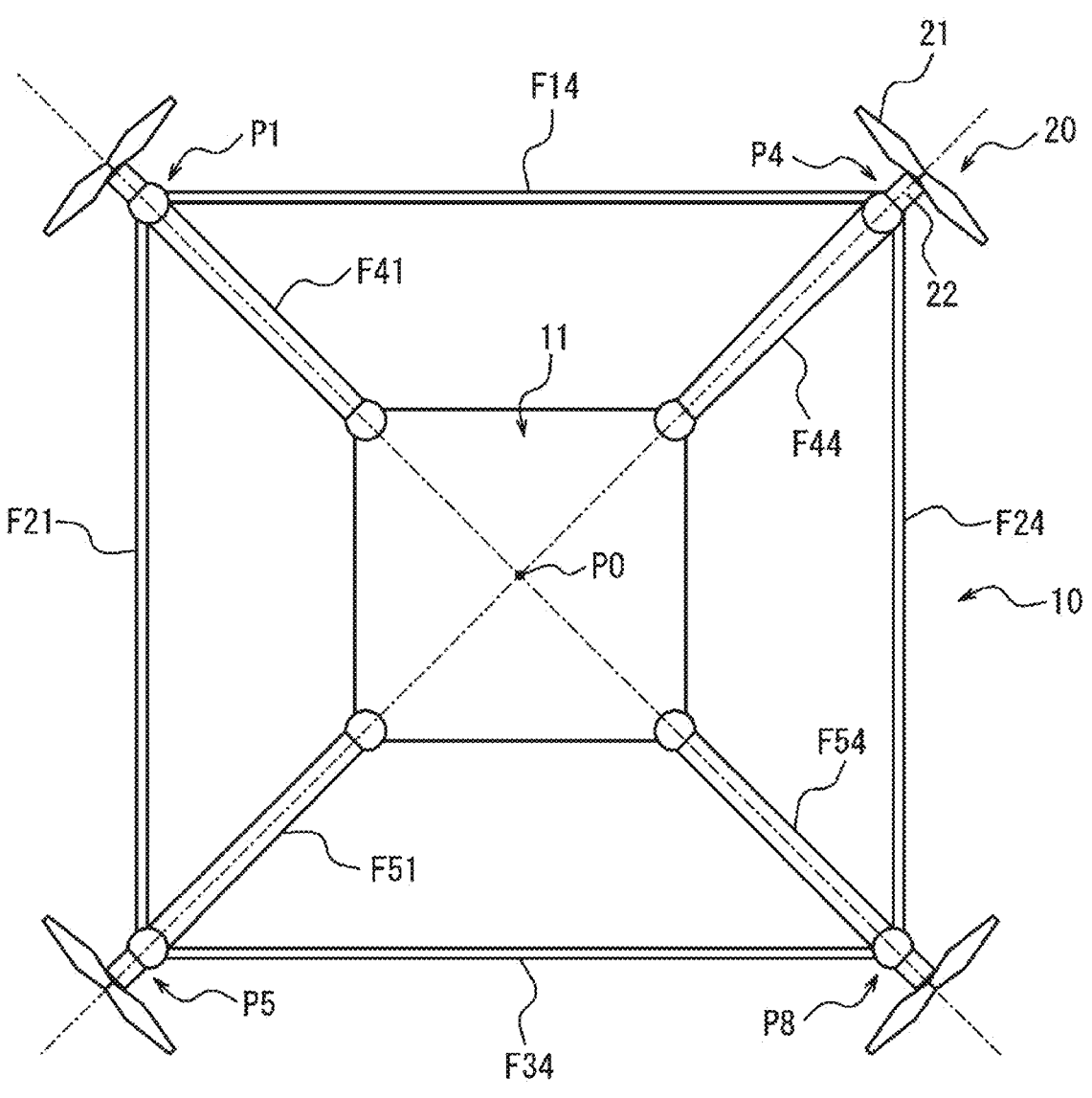
FIG. 3 is a side view of a regular hexahedron illustrated in FIG. 2 and illustrates a lateral face thereof.

FIG. 3 is a side view of the regular hexahedron illustrated in FIG. 2 and illustrates a lateral face thereof. The side view in FIG. 3 is a front view of one of the plurality of lateral faces of the regular hexahedron illustrated in FIG. 2 that is defined by the frames F14, F24, F34, and F21. FIG. 3 illustrates the appearance of the mobile object 1 seen facing the above lateral face. The mobile object 1 is configured symmetrically with respect to the directions of three axes of X axis, Y axis, and Z axis that define a Cartesian coordinate system. Therefore, the appearance of the mobile object 1 seen facing any of the other five faces is the same as in FIG. 3.

As illustrated in FIGS. 2 and 3, the rotary-wing modules 20 including the rotary wings 21 and the drive units 22 configured to drive the rotary wings 21 are attached to the body 10 at vertices of the first polyhedron. More specifically, the rotary-wing modules 20 are arranged in such a manner as to be rotatable about respective rotation axes each defined at a corresponding one of the first vertex P1, the second vertex P2, the third vertex P3, the fourth vertex P4, the fifth vertex P5, the sixth vertex P6, the seventh vertex P7, and the eighth vertex P8. The rotary-wing modules 20 are rotatable both clockwise and counterclockwise about the respective rotation axes.

In such a configuration, the rotary wings 21 and the drive units 22 included in the rotary-wing modules 20 are located outside the body 10. The rotary wings 21 and the drive units 22 are arranged in such a manner as to rotate outside the regular hexahedron defined by the twelve frames F11, F12, F13, F14, F21, F22, F23, R24, F31, F32, F33, and F34.

The eight rotary-wing modules 20 are arranged symmetrically to each other with respect to the body 10. The eight rotary-wing modules 20 are of identical shape and size. The rotary wings 21 included in the rotary-wing modules 20 are of identical shape and size among the eight rotary-wing modules 20. The drive units 22 included in the rotary-wing modules 20 are of identical shape and size among the eight rotary-wing modules 20.

The rotary wings 21 and the drive units 22 each have a rotation axis that is a straight line connecting a reference point P0 and a corresponding one of the vertices of the first polyhedron to each other. The reference point P0 is defined inside the body 10. For example, referring to FIG. 3, the rotary wing 21 and the drive unit 22 located at the first vertex P1 have a rotation axis that is a straight line connecting the reference point P0 and the first vertex P1 to each other. The rotary wing 21 and the drive unit 22 located at the fourth vertex P4 have a rotation axis that is a straight line connecting the reference point P0 and the fourth vertex P4 to each other. The rotary wing 21 and the drive unit 22 located at the eighth vertex P8 have a rotation axis that is a straight line connecting the reference point P0 and the eighth vertex P8 to each other. The rotary wing 21 and the drive unit 22 located at the fifth vertex P5 have a rotation axis that is a straight line connecting the reference point P0 and the fifth vertex P5 to each other. Description similar to the above applies to the rotary wings 21 and the drive units 22 located at the other vertices of the second vertex P2, the third vertex P3, the sixth vertex P6, and the seventh vertex P7.

In the present disclosure, "reference point P0" is, for example, the center of gravity of the body 10. "Center of gravity" refers to the center of mass that is expressed by the weighted arithmetic mean of all points of a physical object of interest. If a physical object of interest has an even density and has a symmetrical shape with respect to the three axial directions, the center of mass coincides with the geometric center of a figure representing the physical object. "Geometric center" refers to a position defined by an arithmetic mean that is obtained from all points belonging to the figure.

For example, the mobile object 1 is symmetrical with respect to the three axial directions. In such a configuration, if the density of the body 10 including the accommodation box 11 is even at an arbitrary point without being uneven at a certain point, the reference point P0 coincides with the geometric center of the body 10. The reference point P0 is also the geometric center of the first polyhedron serving as the body 10.

In the mobile object 1, the geometric center of the accommodation box 11 and the geometric center of the first polyhedron coincide with each other at the reference point P0. The eight diagonal frames F41, F42, F43, F44, F51, F52, F53, and F54 that couple the first polyhedron provided as the regular hexahedron defined by the twelve frames F11, F12, F13, F14, F21, F22, F23, R24, F31, F32, F33, and F34 to the accommodation box 11 extend on corresponding ones of the rotation axes of the rotary wings 21 and the drive units 22.

For example, referring to FIG. 3, the frame F41 extends on the rotation axis of the rotary wing 21 and the drive unit 22 located at the first vertex P1. The frame F44 extends on the rotation axis of the rotary wing 21 and the drive unit 22 located at the fourth vertex P4. The frame F54 extends on the rotation axis of the rotary wing 21 and the drive unit 22 located at the eighth vertex P8. The frame F51 extends on the rotation axis of the rotary wing 21 and the drive unit 22 located at the fifth vertex P5. Description similar to the above applies to the other frames F42, F43, F52, and F53.

The rotary wings 21 located at the respective vertices are each configured to rotate in a plane orthogonal to the corresponding rotation axis. The plane faces toward the reference point P0. For example, referring to FIG. 3, the rotary wing 21 located at the first vertex P1 is configured to rotate in a plane orthogonal to the corresponding rotation axis, that is, the frame F41. The rotary wing 21 located at the fourth vertex P4 is configured to rotate in a plane orthogonal to the corresponding rotation axis, that is, the frame F44. The rotary wing 21 located at the eighth vertex P8 is configured to rotate in a plane orthogonal to the corresponding rotation axis, that is, the frame F54. The rotary wing 21 located at the fifth vertex P5 is configured to rotate in a plane orthogonal to the corresponding rotation axis, that is, the frame F51. Description similar to the above applies to the other rotary wings 21 located at the second vertex P2, the third vertex P3, the sixth vertex P6, and the seventh vertex P7.

Figure 4:
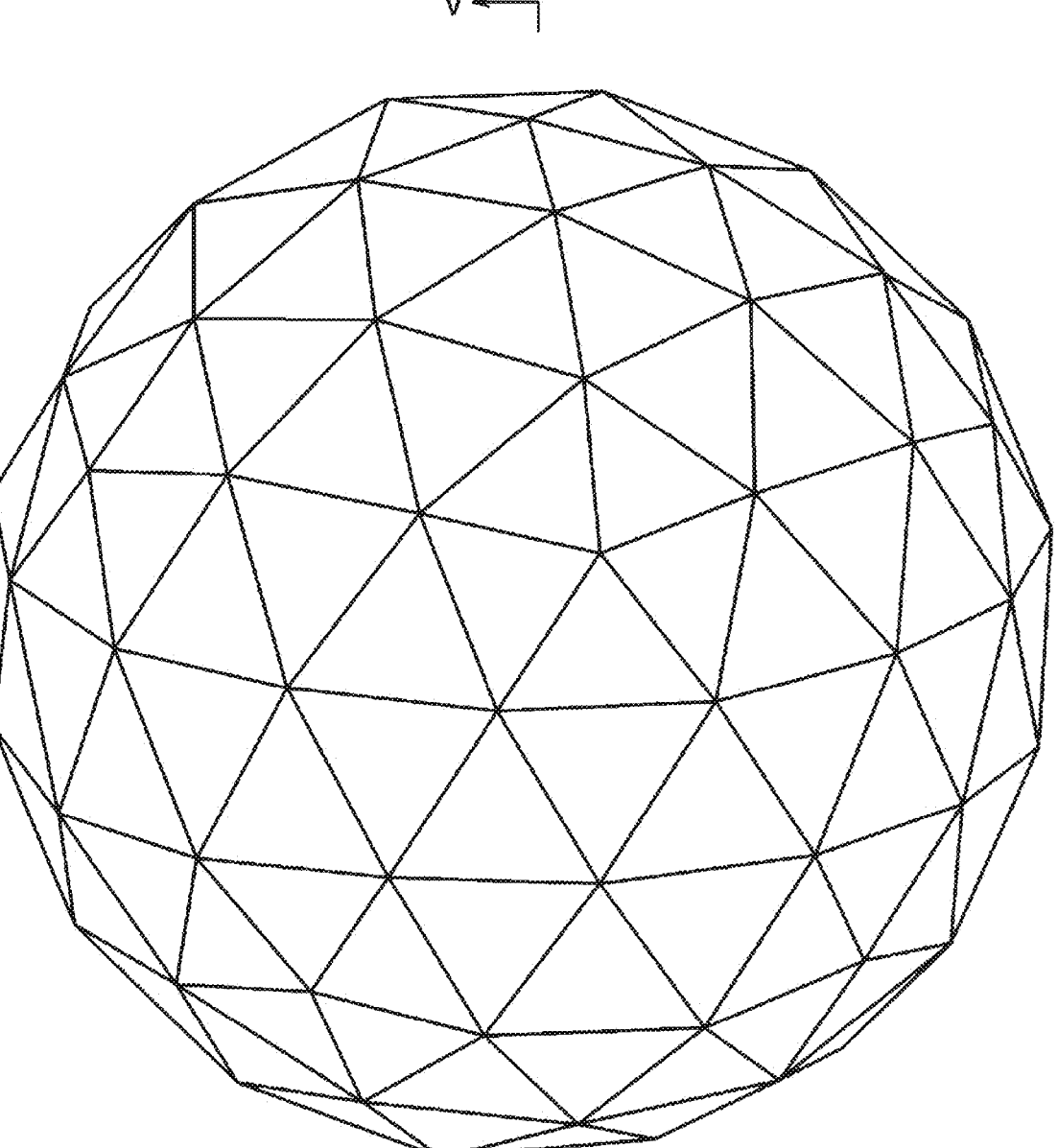
FIG. 4 is a diagram illustrating another part of the configuration of the mobile object illustrated in FIG. 1.
Figure 5:
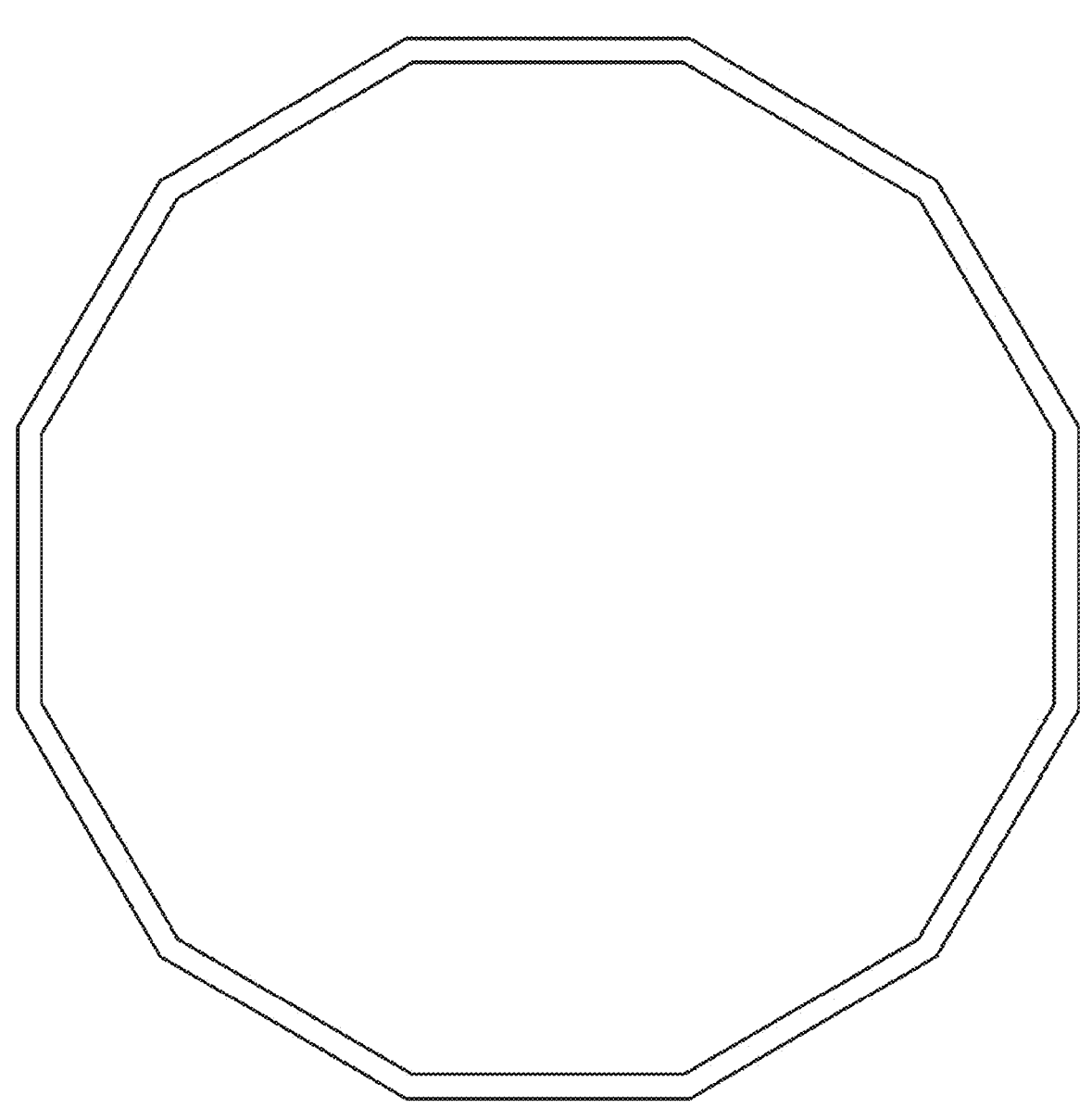
FIG. 5 is a diagram illustrating a section taken along arrowed line V-V given in FIG. 4.

FIG. 4 is a diagram illustrating another part of the configuration of the mobile object 1 illustrated in FIG. 1. In FIG. 4, the body 10 and the rotary-wing modules 20 of the mobile object 1 are not illustrated, and only the cage 30 is illustrated. FIG. 5 is a diagram illustrating a section taken along arrowed line V-V given in FIG. 4.

The cage 30 is provided as a second polyhedron. The second polyhedron is a lattice dome. More specifically, the lattice dome is a Fuller dome (geodesic dome). The cage 30 provided as a Fuller dome has a section defined by the periphery of, for example, a regular dodecagon, or a regular icosahedron or a truncated icosahedron, which is a semi-regular polyhedron. The cage 30 is constituted by a plurality of frame combinations that are each a minimum structural unit forming a triangle and that are connected to each other. The triangular area surrounded by each of the frame combinations is actually a hollow. No elements are provided in the area. In FIG. 4, for the purpose of simple illustration, frames at the back of the cage 30 are not illustrated but are actually visible through those triangular areas at the front.

The body 10 provided as the first polyhedron and the cage 30 provided as the second polyhedron are connected to each other on the basis of any attaching structure. For example, the cage 30 and the body 10 are connected to each other with at least one arm. One end of the at least one arm is connected to, for example, at least one of the twelve frames F11, F12, F13, F14, F21, F22, F23, R24, F31, F32, F33, and F34. If twelve arms are each connected at one end thereof to a corresponding one of the twelve frames, increased strength of connection is provided between the cage 30 and the body 10. The other end of the at least one arm is connected to any of the frames constituting the second polyhedron serving as the cage 30.

The body 10 and the cage 30 are fixedly coupled to each other with the arm. In such a configuration, the arm coupled to the cage 30 and to the body 10 may be detachable from at least one of the cage 30 and the body 10. The arm that is detachable from at least one of the cage 30 and the body 10 may be obtained through, for example, screwing, fitting, engaging, or the like.

Alternatively, the arm coupled to the cage 30 and to the body 10 may be undetachable from at least one of the cage 30 and the body 10. For example, the arm that is undetachable from at least one of the cage 30 and the body 10 may be obtained through integral molding, bonding, or the like.

As illustrated in FIG. 1, in the mobile object 1, the geometric center of the first polyhedron and the geometric center of the second polyhedron coincide with each other at the reference point P0. The center of gravity and the geometric center of the accommodation box 11 coincide with each other at the reference point P0. The center of gravity and the geometric center of the body 10 as a whole including the accommodation box 11 coincide with each other at the reference point P0. The center of gravity and the geometric center of the eight rotary-wing modules 20 as a whole coincide with each other at the reference point P0. The center of gravity and the geometric center of the cage 30 coincide with each other at the reference point P0. Accordingly, the center of gravity and the geometric center of the mobile object 1 as a whole constituted by the body 10, the eight rotary-wing modules 20, and the cage 30 coincide with each other at the reference point P0.

In the mobile object 1, the configurations of the body 10, the eight rotary-wing modules 20, and the cage 30 are each symmetrical with respect to the three axial directions. In the mobile object 1, the overall configuration including the body 10, the eight rotary-wing modules 20, and the cage 30 is symmetrical with respect to the three axial directions. Even when the mobile object 1 that appears as illustrated in FIG. 1 rotates by 90° toward any one of the four lateral faces of the body 10, the mobile object 1 returns to the same appearance as in FIG. 1.

The mobile object 1 presents an appearance that is identical between when one of the six outer faces of the body 10 provided as a regular hexahedron is oriented to face vertically upward and when another outer face is oriented to face vertically upward. The mobile object 1 is configured symmetrically such that the shape, size, arrangement, and orientation of the combination of four rotary-wing modules 20 located at the top face are identical between when one of the six outer faces of the body 10 is oriented to face vertically upward and when another outer face is oriented to face vertically upward.

From the viewpoint of increasing shock absorbency and reducing excessive deformation to reduce the probability of interference between the lattice dome and the rotary-wing modules 20, the flexural modulus of the material for the frames constituting the first polyhedron and the frames constituting the lattice dome provided as the second polyhedron may be preferably 5.0 GPa or greater, more preferably 8.0 GPa or greater; and preferably 250.0 GPa or less, more preferably 60.0 GPa or less, much more preferably 20.0 GPa or less. From the same viewpoint as above, the flexural strength of the material may be preferably 50.0 MPa or greater, more preferably 100.0 MPa or greater, much more preferably 250.0 MPa or greater; and preferably 30.0 GPa or less. The flexural modulus and the flexural strength described above are based on the flexural strength specified by ISO 178.

To achieve at least one of the flexural modulus and the flexural strength described above, the above material may be a resin material, for example: one of or two or more of thermoplastic resins such as polyethylene resin, polypropylene resin, polystyrene resin, ABS resin, vinyl chloride resin, methyl methacrylate resin, nylon resin, fluorocarbon resin, polycarbonate resin, polyester resin, polyether ether ketone resin, polyimide resin, and polyphenylene sulfide resin; a thermoplastic resin composition containing any of the foregoing thermoplastic resins and an additive that is a thermoplastic elastomer or the like such as olefin-based elastomer, styrene-based elastomer, polyester-based elastomer, silicone-based elastomer, acrylate-based elastomer, or urethane-based elastomer; a curable resin composition containing any of the foregoing thermoplastic resins and a curable resin such as epoxy resin or phenol resin; or a fiber-reinforced material obtained by reinforcing any of the foregoing materials with a fibrous material. The fibrous material may be one of or two or more of glass fiber, carbon fiber, aramid fiber, and the like. Any of the above resin materials may be molded into a specific shape to be used as the frames.

The above material is not limited to the above resin material and may be, for example, any of metal materials such as pure titanium, a titanium alloy, steel, an aluminum alloy, and a magnesium alloy; and steels such as maraging steel, stainless steel, and soft iron. While such a metal material can be molded into a specific shape to be used as the frames, the frames may each have a hollow structure, a honeycomb structure, or the like so that the frames have lighter weight and higher strength.

From the viewpoint of increasing shock absorbency of the second polyhedron, the frames constituting the lattice dome may preferably be made of any of the above resin materials. From a viewpoint similar to the above, the frames constituting the first polyhedron may be made of any of the above resin materials. From the viewpoint of reducing excessive deformation, however, the frames constituting the first polyhedron may have higher flexural modulus or higher flexural strength than the material for the frames constituting the lattice dome. In that case, any of the above metal materials may be employed.

Figure 6:
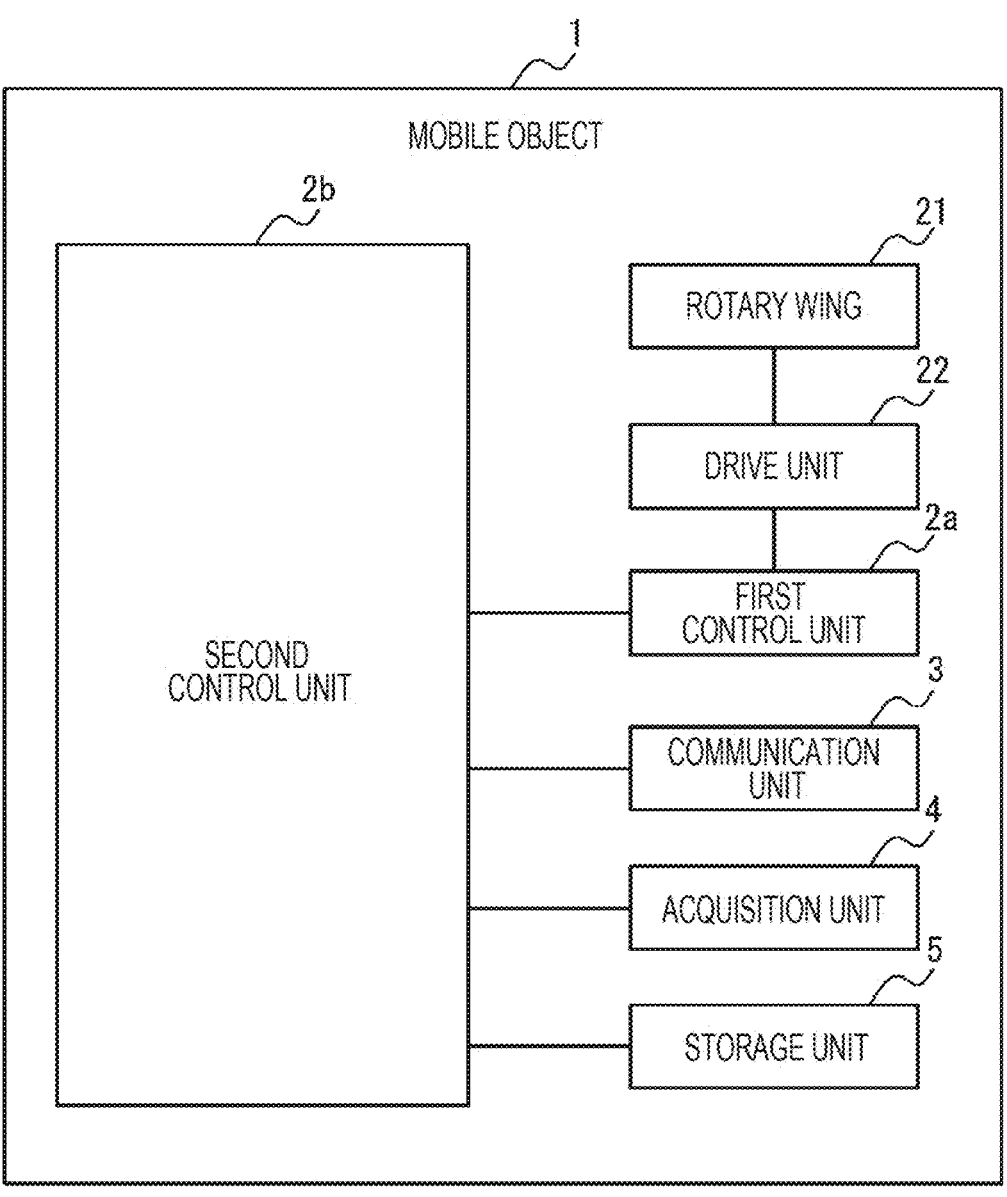
FIG. 6 is a functional block diagram illustrating a configuration of the mobile object illustrated in FIG. 1.

FIG. 6 is a functional block diagram illustrating a configuration of the mobile object 1 illustrated in FIG. 1. The mobile object 1 includes, in addition to the rotary-wing modules 20 including the rotary wings 21 and the drive units 22, a first control unit 2a, a second control unit 2b, a communication unit 3, an acquisition unit 4, and a storage unit 5. In the mobile object 1, the rotary-wing modules 20 are located outside the body 10, whereas the first control unit 2a, the second control unit 2b, the communication unit 3, the acquisition unit 4, and the storage unit 5 are accommodated inside the accommodation box 11.

The rotary wing 21 encompasses a wing configured to rotate in a predetermined direction to provide propulsion to the mobile object 1. Examples of the rotary wing 21 include a propeller, a rotor, and the like. The rotary wing 21 is configured to rotate at a predetermined number of revolutions about the above-described corresponding rotation axis. In the present disclosure, "predetermined number of revolutions" may be, for example, any value within a range from the maximum value outputtable as the performance of the rotary-wing module 20 to zero. The eight rotary wings 21 are rotatable in the same direction of rotation and at the same number of revolutions, or are rotatable such that at least one of the direction of rotation and the number of revolutions is different thereamong.

The drive unit 22 encompasses a mechanism configured to drive the rotary wing 21. Examples of the drive unit 22 include a motor and the like. The drive unit 22 is configured to rotate the rotary wing 21 attached thereto, on the basis of a control signal that is outputted from the first control unit 2a. The drive unit 22 is configured to rotate the rotary wing 21 at a predetermined number of revolutions about the above-described corresponding rotation axis. The eight drive units 22 are capable of rotating the eight respective rotary wings 21 in the same direction of rotation and at the same number of revolutions, and are capable of rotating the eight respective rotary wings 21 such that at least one of the direction of rotation and the number of revolutions is different thereamong.

The first control unit 2a includes one or more processors. In the present disclosure, "processor" encompasses, for example, a general-purpose processor, a dedicated processor specialized in a specific process, and the like. The first control unit 2a functions as, for example, a module for controlling motor output, such as an ESC (electric speed controller) intended for drones designed for flight. The first control unit 2a is communicatively connected to the second control unit 2b and to the drive unit 22. The first control unit 2a is configured to output a control signal to the drive unit 22 on the basis of first control information that is outputted from the second control unit 2b, and thus control the operation of the drive unit 22. The first control unit 2a is provided one each for the eight rotary-wing modules 20.

The communication unit 3 includes a communication module configured to enable communication between the mobile object 1 and a control device. The communication unit 3 includes an antenna. The communication unit 3 is configured to receive a signal wave from the control device through radio communication with the use of the antenna. In the present disclosure, "signal wave" encompasses, for example, radio wave, visible light, infrared light, ultraviolet light, and the like. The communication unit 3 is configured to receive second control information from the control device through radio communication. The second control information is provided for the mobile object 1 to control actions regarding the movement of the mobile object 1 including traveling route, traveling attitude, traveling speed, and the like. In addition, the communication unit 3 is capable of receiving any information to be used for actions of the mobile object 1.

The acquisition unit 4 includes one or more receivers compatible with any satellite positioning system. For example, the acquisition unit 4 includes a GPS (global positioning system) receiver. The acquisition unit 4 is configured to acquire, as position information, measured values representing the position of the mobile object 1. Position information includes address, latitude, longitude, altitude, and so forth. The acquisition of the position information on the mobile object 1 by the acquisition unit 4 may be performed constantly, or may be performed regularly or irregularly.

In addition, the acquisition unit 4 may include one or more imaging devices, such as cameras, as sensor devices. The acquisition unit 4 may acquire any image data or the like with the use of such imaging devices. The acquisition unit 4 may further include any other sensor device. The acquisition unit 4 may acquire any data, information, and the like with the use of the sensor device. For example, the acquisition unit 4 may further include any sensor capable of acquiring information on air currents. Examples of the sensor include a wind-speed sensor, a wind-direction sensor, and the like. The acquisition unit 4 may acquire information on air currents on the basis of the sensor.

The storage unit 5 is, but is not limited to, a semiconductor memory, a magnetic memory, an optical memory, or the like, for example. The storage unit 5 functions as a main storage device, a subsidiary storage device, or a cache memory. The storage unit 5 is configured to store any information to be used for actions of the mobile object 1. The storage unit 5 is configured to store system programs, application programs, various pieces of information to be received by or transmitted from the communication unit 3, and the like. The information stored in the storage unit 5 is updatable with information that is received from the communication unit 3 through radio communication.

The mobile object 1 according to the above embodiment can move stably regardless of external factors such as wind and collision with an obstacle. In the mobile object 1, the rotary wings 21 each have a rotation axis that is a straight line connecting the reference point P0, defined inside the body 10, and a corresponding one of the vertices of the first polyhedron to each other. Therefore, even if the attitude of the body 10 provided as the first polyhedron changes, the mobile object 1 can present an appearance that is similar between when one face of the first polyhedron is oriented to face vertically upward and when another face is oriented to face vertically upward. The mobile object 1 can be configured such that the arrangement and orientation of the combination of rotary-wing modules 20 that are in the same number as the vertices of one face located as the top face become similar between when the one face of the first polyhedron is oriented to face vertically upward and when another face is oriented to face vertically upward.

For example, suppose that any of external factors such as wind and collision with an obstacle rotates the mobile object 1 and thus changes the attitude thereof such that the top face of the mobile object 1 changes from one face of the first polyhedron to another face. Even in such a situation, the mobile object 1 can continue to move with a similar propulsion between the case of one face of the first polyhedron and the case of another face, with the propulsion being generated by a combination of rotary-wing modules 20 that are in a similar number, arrangement, and orientation between the two cases. Therefore, the mobile object 1 can be provided with a reduced probability of falling during flight unlike, for example, known drones and the like, even if the mobile object 1 significantly changes the attitude thereof with rotation or the like. The mobile object 1 can continue to fly stably even if the attitude thereof is disturbed, and exhibits excellent resistance to gusts of wind.

The mobile object 1 can present a similar appearance even if the mobile object 1 rotates by a rotation angle corresponding to the rotational symmetry of the first polyhedron. For example, assuming that the rotational symmetry of the first polyhedron is n-fold rotational symmetry, when the mobile object 1 with one face of the first polyhedron being the top face rotates by an angle of $360/n°$, another face can take the place of the top face. The mobile object 1 can be configured symmetrically with respect to the directions of a plurality of axes intersecting each other at an angle of $360/n°$.

In the mobile object 1, the reference point P0 is the center of gravity of the body 10. Therefore, the above advantageous effects regarding stable movement are more pronounced. More specifically, the mobile object 1 can be configured such that when one face of the first polyhedron is the top face, the plurality of rotary wings 21 located at the plurality of vertices of the one face are each oriented toward the center of gravity. Therefore, for example, during the flight with the one face being the top face, the mobile object 1 can activate corresponding ones of the rotary-wing modules 20 with reference to the center of gravity of the body 10. Thus, the mobile object 1 can more stably maintain the attitude thereof.

In the mobile object 1, the reference point P0 is the center of gravity of the body 10 and is also the geometric center of the first polyhedron serving as the body 10. Therefore, the mobile object 1 can have increased symmetry. More specifically, as long as the rotary-wing modules 20 are of identical shape and size, the mobile object 1 can present an appearance that is more similar between when one face of the first polyhedron is oriented to face vertically upward and when another face is oriented to face vertically upward, even if the attitude of the body 10 provided as the first polyhedron changes. The mobile object 1 can be configured such that the arrangement and orientation of the combination of rotary-wing modules 20 that are in the same number as the vertices of one face located as the top face become more similar between when the one face of the first polyhedron is oriented to face vertically upward and when another face is oriented to face vertically upward.

For example, suppose that any of external factors such as wind and collision with an obstacle rotates the mobile object 1 and thus changes the attitude thereof such that the top face of the mobile object 1 changes from one face of the first polyhedron to another face. Even in such a situation, the mobile object 1 can continue to move with a more similar propulsion between the case of one face of the first polyhedron and the case of another face, with the propulsion being generated by a combination of rotary-wing modules 20 that are in a more similar number, arrangement, and orientation between the two cases. Therefore, the mobile object 1 can be provided with a farther reduced probability of falling during flight unlike, for example, known drones and the like, even if the mobile object 1 significantly changes the attitude thereof with rotation or the like. The mobile object 1 can continue to fly more stably even if the attitude thereof is disturbed, and exhibits more excellent resistance to gusts of wind.

Even if the center of gravity of the body 10 is different from the geometric center of the first polyhedron whereas the reference point P0 is the geometric center of the first polyhedron, the mobile object 1 is stably movable in a manner similar to the above by adjusting any factor such as the number of revolutions of the rotary-wing modules 20 in correspondence with the deviation in the center of gravity relative to the geometric center.

In the mobile object 1, the first polyhedron is a regular hexahedron. Therefore, the mobile object 1 can have more increased symmetry. More specifically, as long as the rotary-wing modules 20 are of identical shape and size and the reference point P0 coincides with the geometric center of the first polyhedron, the mobile object 1 can present an appearance that is identical between when one face of the first polyhedron is oriented to face vertically upward and when another face is oriented to face vertically upward, even if the attitude of the body 10 provided as the first polyhedron changes. The mobile object 1 can be configured such that the arrangement and orientation of the combination of four rotary-wing modules 20 become identical between when one face of the first polyhedron is oriented to face vertically upward and when another faces is oriented to face vertically upward.

For example, suppose that any of external factors such as wind and collision with an obstacle rotates the mobile object 1 and thus changes the attitude thereof such that the top face of the mobile object 1 changes from one face of the first polyhedron to another face. Even in such a situation, the mobile object 1 can continue to move with the same propulsion between the case of one face of the first polyhedron and the case of another face, with the propulsion being generated by a combination of rotary-wing modules 20 that are in the same number, arrangement, and orientation between the two cases. Therefore, the mobile object 1 can be provided with a farther reduced probability of falling during flight unlike, for example, known drones and the like, even if the mobile object 1 significantly changes the attitude thereof with rotation or the like. The mobile object 1 can continue to fly more stably even if the attitude thereof is disturbed, and exhibits more excellent resistance to gusts of wind.

In such a configuration, the rotational symmetry of the first polyhedron of the mobile object 1 is 4-fold rotational symmetry. Therefore, when the mobile object 1 with one face of the first polyhedron being the top face rotates by an angle of 90°, another face can take the place of the top face. The mobile object 1 can be configured symmetrically with respect to the directions of three axes of X axis, Y axis, and Z axis that intersect each other at an angle of 90°. The mobile object 1 is capable of flying extremely quickly and precisely with respect to the directions of all of the three axes. The mobile object 1 is movable stably regardless of the frontward, backward, leftward, rightward, upward, and downward directions.

The mobile object 1 performs movement and attitude maintenance by activating, with one face of the first polyhedron being the face on the upper side in the vertical direction, only the rotary-wing modules that are located at vertices of the one face. For example, with one face of the regular hexahedron being the top face, the mobile object 1 is also capable of moving and hovering by activating only four of the rotary-wing modules 20 that are located at the four respective vertices of the one face. The mobile object 1 is movable even without activating the remaining four rotary-wing modules 20 that are located at the bottom face thereof. Thus, the mobile object 1 is movable with a smaller energy consumption than in a case where all of the eight rotary-wing modules 20 are to be activated to maintain the stable attitude. The mobile object 1 can save energy to be used for movement.

To summarize, the mobile object 1 is configured to activate, for movement and attitude maintenance, the rotary-wing modules 20 that are located at vertices of the top face thereof. On the other hand, in response to the mobile object 1 changing the attitude thereof such that the one face is no longer the top face, the mobile object 1 changes the attitude thereof by activating the rotary-wing modules 20 at vertices of the first polyhedron such that the one face or another face different from the one face takes the place of the top face. For example, the mobile object 1 is also capable of changing the attitude thereof by activating the eight rotary-wing modules 20 that are located at the eight respective vertices of the regular hexahedron. Therefore, even if the attitude of the mobile object 1 changes from a stable attitude to be established for movement and attitude maintenance, the mobile object 1 can easily recover a similar stable attitude.

Hence, the mobile object 1 can move stably regardless of external factors such as wind and collision with an obstacle.

If the mobile object 1 that is hovering is about to undergo an unintentional rotation as a reaction to the rotation of the rotary wings 21 instead of remaining still, the occurrence of such a rotation can be reduced through various methods. The methods include those using the rotary wings 21, such as a tandem-rotor method, a coaxial-rotor method, and an inter-meshing-rotor method; a method in which air currents generated by the rotary wings 21 are adjusted with the use of a fixed wing or a variable-sweep wing; and the like.

The cage 30 defining the outline shape of the mobile object 1 is provided as the second polyhedron. Therefore, even if the mobile object 1 interferes with an obstacle, the mobile object 1 can continue to move by actively rotating in conformity with the shape of the second polyhedron. More specifically, when the mobile object 1 collides with an obstacle, the element that first interferes with the obstacle is the cage 30. Therefore, even if the mobile object 1 collides with an obstacle, the mobile object 1 can continue to move by rotating relative to the obstacle in conformity with the shape of the second polyhedron serving as the cage 30. In such a configuration, since the cage 30 is fixed to the body 10, the body 10 rotates with the rotation of the cage 30 in a similar manner to the cage 30.

In the mobile object 1, the second polyhedron is a lattice dome. Therefore, the cage 30 has increased symmetry. Hence, in the event of interference with an obstacle, the cage 30 can more easily undergo the active rotation that conforms to the shape of the second polyhedron. Thus, the mobile object 1 can more easily continue to move even if colliding with an obstacle. Accordingly, in a use of the mobile object 1 for, for example, an inspection in a narrow space, the mobile object 1 can continue to move with no problem even if the mobile object 1, intended to take an image of an examination target portion, moves close to and interferes with the examination target portion. For example, even if the mobile object 1 flies close to and interferes with an examination target portion, the mobile object 1 is less likely to fall because the cage 30 thereof is actively rotatable.

In the mobile object 1, the cage 30 has increased symmetry. Therefore, the air resistance during movement can be reduced. Accordingly, the mobile object 1 can move stably regardless of external factors such as wind and collision with an obstacle. In addition, in the mobile object 1, an external impact that is generated at, for example, the interference with an obstacle can be reduced. Furthermore, in the mobile object 1, the symmetrical configuration can reduce the weight of the cage 30. Accordingly, the mobile object 1 is movable with a reduced amount of energy that is consumed in correspondence with the weight thereof. The mobile object 1 can save energy to be used for movement.

In the mobile object 1, the lattice dome provided as the second polyhedron is a Fuller dome. Therefore, all of the above advantageous effects brought by the symmetry of the cage 30 are more pronounced.

In the mobile object 1, the cage 30 is fixed to the body 10. Therefore, the attitude of the body 10 can be made less likely to sway relative to the cage 30. If the cage 30 and the body 10 are attached to each other with a gimbal structure to maintain the body 10 level, the body 10 tends to maintain the levelness thereof against the rotation of the cage 30. Such a structure, however, causes the attitude of the body 10 to significantly sway. The mobile object 1 employs an attaching structure different from such a gimbal structure. Therefore, such swaying in the attitude of the body 10 can be reduced satisfactorily.

It is obvious to those skilled in the art that the present disclosure can be embodied in other given forms, in addition to the above embodiment, without departing from the spirit or essential features thereof. Hence, the above description is only exemplary and is not limiting. The scope of the disclosure is defined not by the above description but by the appended claims. Among various changes, some changes made within a scope equivalent to the scope of the disclosure are encompassed in the disclosure.

For example, the shapes, sizes, arrangements, orientations, numbers, and the like of the above-described elements are not limited to those described above and illustrated in the drawings. The shapes, sizes, arrangements, orientations, numbers, and the like of the elements may be determined in any way, as long as the functions of the elements can be realized.

While the above embodiment relates to a case where the rotary wings 21 included in the rotary-wing modules 20 are of identical shape and size among the eight rotary-wing modules 20, such an embodiment is not limiting. At least one of the shape and the size of the rotary wings 21 may be different among the eight rotary-wing modules 20. While the above description relates to a case where the drive units 22 included in the rotary-wing modules 20 are of identical shape and size among the eight rotary-wing modules 20, such an embodiment is not limiting. At least one of the shape and the size of the drive units 22 may be different among the eight rotary-wing modules 20.

While the above embodiment relates to a case where the reference point P0 is the center of gravity of the body 10 and is also the geometric center of the first polyhedron, such an embodiment is not limiting. The reference point P0 may be any other point that is defined inside the body 10 but does not coincide with either of the center of gravity of the body 10 and the geometric center of the first polyhedron.

While the above embodiment relates to a case where the center of gravity of the body 10 and the geometric center of the first polyhedron coincide with each other, such an embodiment is not limiting. The center of gravity of the body 10 and the geometric center of the first polyhedron may be different from each other. The reference point P0 may be either of the center of gravity of the body 10 and the geometric center of the first polyhedron, or may be any other point that is defined inside the body 10 but does not coincide with either of the two.

While the above embodiment relates to a case where, in the mobile object 1, the geometric center of the accommodation box 11 and the geometric center of the first polyhedron coincide with each other at the reference point P0, such an embodiment is not limiting. The geometric center of the accommodation box 11 and the geometric center of the first polyhedron may be different from each other. The reference point P0 may be either of the geometric center of the accommodation box 11 and the geometric center of the first polyhedron, or may be any other point that is defined inside the body 10 but does not coincide with either of the two.

While the above embodiment relates to a case where, in the mobile object 1, the geometric center of the first polyhedron and the geometric center of the second polyhedron coincide with each other at the reference point P0, such an embodiment is not limiting. The geometric center of the first polyhedron and the geometric center of the second polyhedron may be different from each other. The reference point P0 may be either of the geometric center of the first polyhedron and the geometric center of the second polyhedron, or may be any other point that is defined inside the body 10 but does not coincide with either of the two.

While the above embodiment relates to a case where the center of gravity and the geometric center of the accommodation box 11 coincide with each other at the reference point P0, such an embodiment is not limiting. The center of gravity and the geometric center of the accommodation box 11 may be different from each other. The reference point P0 may be either of the center of gravity and the geometric center of the accommodation box 11, or may be any other point that is defined inside the body 10 but does not coincide with either of the two.

While the above embodiment relates to a case where the center of gravity and the geometric center of the body 10 as a whole including the accommodation box 11 coincide with each other at the reference point P0, such an embodiment is not limiting. The center of gravity and the geometric center of the body 10 as a whole may be different from each other. The reference point P0 may be either of the center of gravity and the geometric center of the body 10 as a whole, or may be any other point that is defined inside the body 10 but does not coincide with either of the two.

While the above embodiment relates to a case where the center of gravity and the geometric center of the eight rotary-wing modules 20 as a whole coincide with each other at the reference point P0, such an embodiment is not limiting. The center of gravity and the geometric center of the eight rotary-wing modules 20 as a whole may be different from each other. The reference point P0 may be either of the center of gravity and the geometric center of the eight rotary-wing modules 20 as a whole, or may be any other point that is defined inside the body 10 but does not coincide with either of the two.

While the above embodiment relates to a case where the center of gravity and the geometric center of the cage 30 coincide with each other at the reference point P0, such an embodiment is not limiting. The center of gravity and the geometric center of the cage 30 may be different from each other. The reference point P0 may be either of the center of gravity and the geometric center of the cage 30, or may be any other point that is defined inside the body 10 but does not coincide with either of the two.

While the above embodiment relates to a case where the center of gravity and the geometric center of the mobile object 1 as a whole constituted by the body 10, the eight rotary-wing modules 20, and the cage 30 coincide with each other at the reference point P0, such an embodiment is not limiting. The center of gravity and the geometric center of the mobile object 1 as a whole may be different from each other. The reference point P0 may be either of the center of gravity and the geometric center of the mobile object 1 as a whole, or may be any other point that is defined inside the body 10 but does not coincide with either of the two.

While the above embodiment relates to a case where the first polyhedron is a regular hexahedron, such an embodiment is not limiting. The first polyhedron may be any three-dimensional body that is defined by four or more planes. While the above description relates to a case where if the first polyhedron is a regular hexahedron, the mobile object 1 is configured symmetrically with respect to the directions of three axes of X axis, Y axis, and Z axis that defines a Cartesian coordinate system, such an embodiment is not limiting. If the rotational symmetry of the first polyhedron is n-fold rotational symmetry, the mobile object 1 may be configured symmetrically with respect to the directions of a plurality of axes intersecting each other at an angle of $360/n°$.

Figure 7:
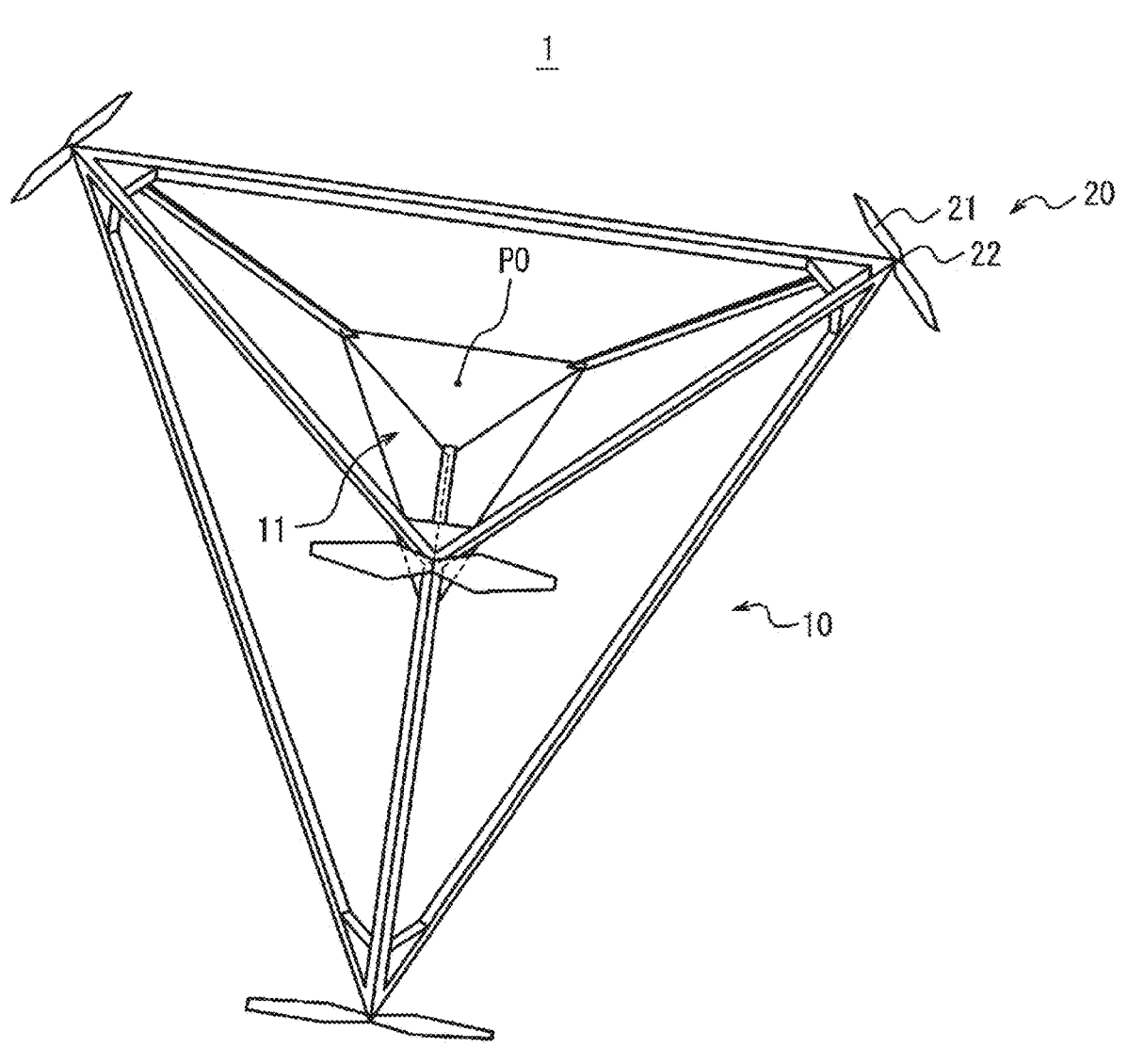
FIG. 7 is a diagram illustrating a part of a configuration of a mobile object according to a variation of the present disclosure.

FIG. 7 is a diagram illustrating a part of a configuration of a mobile object 1 according to a variation of the present disclosure. In FIG. 7, as in FIG. 2, the cage 30 of the mobile object 1 is not illustrated, and only the body 10 and the rotary-wing modules 20 are illustrated.

The first polyhedron may be a three-dimensional body that is a tetrahedron defined by four planes. For example, the first polyhedron may be a regular tetrahedron. The body 10 provided as the first polyhedron may have an outline shape of a regular tetrahedron.

The body 10 may include an accommodation box 11 located inside a regular tetrahedron defined by six frames. The accommodation box 11 may be connected to ends of four frames on a side opposite the respective vertices of the regular tetrahedron. The accommodation box 11 may be a sphere or a polyhedron. For example, the accommodation box 11 may be provided as a regular tetrahedron. The body 10 may be obtained by placing the accommodation box 11, which is a regular tetrahedron, inside the regular tetrahedron provided as the first polyhedron defining the outline shape of the body 10.

The rotary-wing modules 20 including the rotary wings 21 and the drive units 22 may each have a rotation axis that is a straight line connecting the reference point P0, defined inside the body 10, and a corresponding one of the vertices of the first polyhedron to each other. In FIG. 7, the reference point P0 may be, for example, the geometric center of one of the faces of the first polyhedron.

To summarize, providing the first polyhedron as a tetrahedron facilitates a weight reduction of the mobile object 1. Accordingly, the mobile object 1 is movable with a reduced amount of energy that is consumed in correspondence with the weight thereof. The mobile object 1 can save energy to be used for movement.

While the above embodiment relates to a case where the mobile object 1 includes the cage 30 that defines the outline shape of the mobile object 1 in such a manner as to surround the body 10 and the rotary-wing modules 20 from outside, such an embodiment is not limiting. The mobile object 1 may include no cage 30.

While the above embodiment relates to a case where the second polyhedron serving as the cage 30 is a lattice dome, such an embodiment is not limiting. The second polyhedron may be any three-dimensional body that is defined by four or more planes.

Figure 8G:
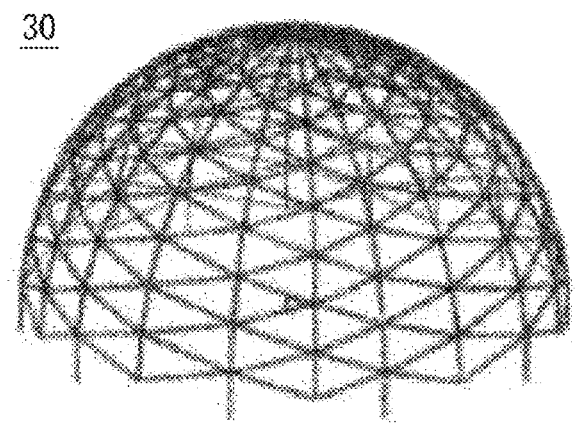
FIG. 8G is a diagram illustrating a part of a configuration of a cage according to a seventh variation.
Figure 8H:
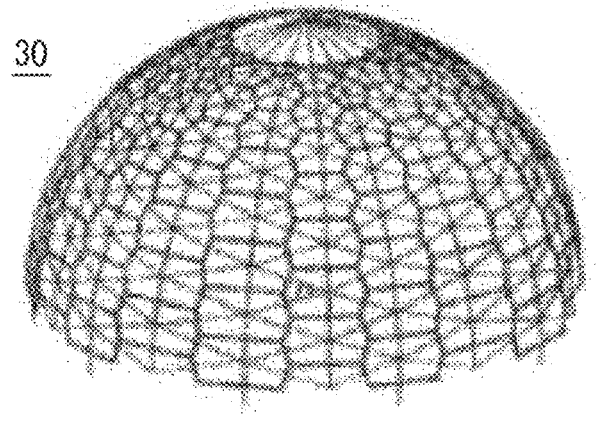
FIG. 8H is a diagram illustrating a part of a configuration of a cage according to an eighth variation.
Figure 8I:
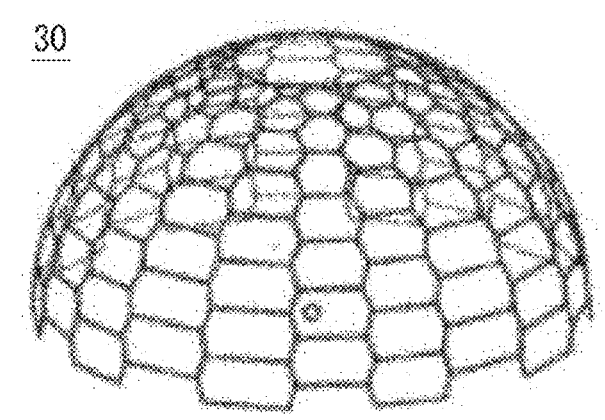
FIG. 8I is a diagram illustrating a part of a configuration of a cage according to a ninth variation.

FIG. 8A is a diagram illustrating a part of a configuration of a cage 30 according to a first variation. FIG. 8B is a diagram illustrating a part of a configuration of a cage 30 according to a second variation. FIG. 8C is a diagram illustrating a part of a configuration of a cage 30 according to a third variation. FIG. 8D is a diagram illustrating a part of a configuration of a cage 30 according to a fourth variation. FIG. 8E is a diagram illustrating a part of a configuration of a cage 30 according to a fifth variation. FIG. 8F is a diagram illustrating a part of a configuration of a cage 30 according to a sixth variation. FIG. 8G is a diagram illustrating a part of a configuration of a cage 30 according to a seventh variation. FIG. 8H is a diagram illustrating a part of a configuration of a cage 30 according to an eighth variation. FIG. 8I is a diagram illustrating a part of a configuration of a cage 30 according to a ninth variation.

While the above embodiment relates to a case where the lattice dome is a Fuller dome, such an embodiment is not limiting. The lattice dome may be a dome having a shape illustrated in any of FIGS. 8A to 8I, or may be a dome having any other shape.

While the above embodiment relates to a case where the cage 30 is fixed to the body 10, such an embodiment is not limiting. The cage 30 may be attached with any rotary structure such as a gimbal structure so that the cage 30 is rotatable relative to the body 10. Thus, the mobile object 1 can maintain the body 10 thereof level even if the cage 30 rotates. For example, even if the cage 30 interferes with an obstacle and actively rotates in conformity with the shape of the second polyhedron, the mobile object 1 can maintain the level attitude thereof with the body 10 being prevented from moving with the rotation of the cage 30. Such a configuration is also applicable to the description of the above embodiment regarding the coupling between the cage 30 and the body 10 with an arm.

While the above embodiment relates to a case where the first control unit 2a is accommodated in the accommodation box 11, such an embodiment is not limiting. The first control unit 2a may be provided outside the accommodation box 11. For example, the first control unit 2a may be included in each of the eight rotary-wing modules 20 and be arranged in such a manner as to be integrated with a corresponding one of the rotary wings 21 and a corresponding one of the drive units 22.

While the above embodiment relates to a case where when one face of the regular hexahedron is the top face, the mobile object 1 is movable by activating only four of the rotary-wing modules 20 that are located at the four respective vertices of the one face, such an embodiment is not limiting. For example, in FIG. 2, the mobile object 1 may be movable by activating only a pair of rotary-wing modules 20 that are located on the longest one of the diagonal lines of the regular hexahedron.

For example, the mobile object 1 may move in such an attitude that the diagonal line connecting the third vertex P3 and the fifth vertex P5 in FIG. 2 extends parallel to the vertical direction. In such a situation, with the rotary-wing module 20 at the third vertex P3 being located vertically upward and the rotary-wing module 20 at the fifth vertex P5 being located vertically downward, the mobile object 1 may move or hover by activating only the two rotary-wing modules 20 such that the corresponding rotary wings 21 rotate in opposite directions. In other words, with the rotary-wing module 20 at one vertex of the first polyhedron being located vertically upward and the rotary-wing module 20 at another vertex on the opposite side being located vertically downward, the mobile object 1 may perform movement and attitude maintenance by activating only the two rotary-wing modules 20 such that the corresponding two rotary wings 21 rotate in opposite directions.

Thus, the mobile object 1 is movable with a much smaller energy consumption than in a case where four of the rotary-wing modules 20 are to be activated to maintain the stable attitude. The mobile object 1 can save energy to be used for movement.

To summarize, the mobile object 1 may be configured to activate, for movement and attitude maintenance, only the rotary-wing modules 20 that are located at two opposite vertices. On the other hand, in response to the mobile object 1 changing the attitude thereof such that positions of the one vertex and the other vertex located opposite each other are shifted, the mobile object 1 may change the attitude thereof by activating the rotary-wing modules 20 at vertices of the first polyhedron such that the same pair or another pair of two vertices that are opposite each other are located vertically upward and downward. For example, the mobile object 1 is also capable of changing the attitude thereof by activating the eight rotary-wing modules 20 that are located at the eight respective vertices of the regular hexahedron. Hence, even if the attitude of the mobile object 1 changes from a stable attitude to be established for movement and attitude maintenance, the mobile object 1 can easily recover a similar stable attitude. Therefore, the mobile object 1 can move stably regardless of external factors such as wind and collision with an obstacle.

While the above embodiment relates to a case where the mobile object 1 encompasses any flying object and the like, such an embodiment is not limiting. The mobile object 1 may encompass any car, vehicle, submarine, and the like. Examples of the mobile object 1 may include a submarine such as an underwater drone. Examples of the mobile object 1 may include a vehicle such as a hovercraft that is movable on at least one of water and land.

The above embodiment relates to a case where the acquisition unit 4 includes an imaging device, such as a camera, as a sensor device. If, for example, the cage 30 is fixed to the body 10 such that the body 10 is configured to rotate with the rotation of the cage 30, the camera may be attached to the body 10 with a gimbal structure so as to be maintained level. If, for example, the cage 30 is attached to the body 10 with a gimbal structure such that the body 10 is maintained level against the rotation of the cage 30, the camera may be fixed to the body 10.

REFERENCE SIGNS LIST

1 mobile object
2a first control unit
2b second control unit
3 communication unit
4 acquisition unit
5 storage unit
10 body
11 accommodation box
20 rotary-wing module
21 rotary wing
22 drive unit
30 cage
F11 frame
F12 frame
F13 frame
F14 frame
F21 frame
F22 frame
F23 frame
F24 frame
F31 frame
F32 frame
F33 frame
F34 frame
F41 frame
F42 frame
F43 frame
F44 frame
F51 frame
F52 frame
F53 frame
F54 frame
P0 reference point
P1 first vertex
P2 second vertex
P3 third vertex
P4 fourth vertex
P5 fifth vertex
P6 sixth vertex
P7 seventh vertex
P8 eighth vertex

The invention claimed is:

1. A mobile object comprising:

a body provided as a first polyhedron; and rotary-wing modules attached to the body at vertices of the first polyhedron, the rotary-wing modules each including a rotary wing and a drive unit, the drive unit being configured to drive the rotary wing, wherein the rotary wings are located outside the body and each have a rotation axis that is a straight line connecting a reference point and a corresponding one of the vertices of the first polyhedron such that the rotation axis of one of the rotary wings and the rotation axis of another one of the rotary wings intersect with each other at the reference point, the reference point being defined inside the body.

2. The mobile object according to claim 1, wherein the reference point is a center of gravity of the body.

3. The mobile object according to claim 1, wherein the reference point is a geometric center of the first polyhedron.

4. The mobile object according to claim 1, wherein the first polyhedron is a regular hexahedron.

5. The mobile object according to claim 1, further comprising:

a cage attached to the body and defining an outline shape of the mobile object in such a manner as to surround the body and the rotary-wing modules from outside, wherein the cage is provided as a second polyhedron.

6. The mobile object according to claim 5, wherein the cage is fixed to the body.

7. The mobile object according to claim 5, wherein the second polyhedron is a lattice dome.

8. The mobile object according to claim 7, wherein the lattice dome is a Fuller dome.

9. The mobile object according to claim 1, wherein the mobile object is a drone designed for flight.

10. A mobile-object-flying method that is a method of flying the mobile object according to claim 1, comprising:

performing movement and attitude maintenance by activating, with one face of the first polyhedron being a face on an upper side in a vertical direction, only the rotary-wing modules that are located at vertices of the one face.

11. The mobile-object-flying method according to claim 10, wherein, in response to the mobile object changing an attitude such that the one face is no longer the face on the upper side, the attitude of the mobile object is changed by activating the rotary-wing modules at vertices of the first polyhedron such that the one face or another face different from the one face takes a place of the face on the upper side.

12. A mobile-object-flying method that is a method of flying the mobile object according to claim 1, comprising:

performing movement and attitude maintenance by activating, with one of the rotary-wing modules that is at one vertex of the first polyhedron being located vertically upward and one of the rotary-wing modules that is at another vertex on an opposite side being located vertically downward, only the two rotary-wing modules such that corresponding two of the rotary wings rotate in opposite directions.

13. The mobile-object-flying method according to claim 12, wherein, in response to the mobile object changing an attitude such that positions of the one vertex and the another vertex located opposite each other are shifted, the attitude is changed by activating the rotary-wing modules at vertices of the first polyhedron such that a same pair or another pair of two vertices that are opposite each other are located vertically upward and downward.

14. A mobile-object-flying method that is a method of flying the mobile object according to claim 5, comprising:

maintaining the body in a level attitude with the cage being rotatable in conformity with a shape of the second polyhedron.

\* \* \* \* \*